US009725252B2

(12) United States Patent
Starz et al.

(10) Patent No.: US 9,725,252 B2
(45) Date of Patent: Aug. 8, 2017

(54) DEVICE FOR TRANSFERRING VEHICLE WHEELS

(75) Inventors: Reiner Starz, Weil der Stadt (DE); Ulrich Hofbauer, Gaeufelden (DE)

(73) Assignee: EISENMANN AG, Boeblingen (DE)

( * ) Notice: Subject to any disclaimer, the term of this patent is extended or adjusted under 35 U.S.C. 154(b) by 370 days.

(21) Appl. No.: 13/261,772

(22) PCT Filed: May 4, 2012

(86) PCT No.: PCT/EP2012/001916
§ 371 (c)(1),
(2), (4) Date: Nov. 7, 2013

(87) PCT Pub. No.: WO2012/152416
PCT Pub. Date: Nov. 15, 2012

(65) Prior Publication Data
US 2014/0064903 A1    Mar. 6, 2014

(30) Foreign Application Priority Data

May 7, 2011    (DE) .......................... 10 2011 100 828

(51) Int. Cl.
| B65G 47/52 | (2006.01) |
| B65G 47/86 | (2006.01) |
| B60B 30/06 | (2006.01) |

(52) U.S. Cl.
CPC .............. B65G 47/52 (2013.01); B60B 30/06 (2013.01); B65G 47/847 (2013.01)

(58) Field of Classification Search
CPC . B65G 47/52; B25J 9/023; B25J 9/041; B25J 15/0616

USPC ...................................... 414/426, 590, 744.3
See application file for complete search history.

(56) References Cited

U.S. PATENT DOCUMENTS

| 4,002,246 | A | * | 1/1977 | Brandt et al. ............... 414/744.3 |
| 4,353,675 | A | * | 10/1982 | Risener et al. ............... 414/403 |
| 4,443,147 | A | * | 4/1984 | Richards .................... 414/792.9 |
| 4,556,362 | A | * | 12/1985 | Bahnck et al. ............. 414/744.3 |
| 4,832,180 | A | * | 5/1989 | Ferrero ...................... 198/468.3 |
| 6,439,631 | B1 | * | 8/2002 | Kress .............................. 294/65 |
| 8,997,592 | B2 | * | 4/2015 | Yang et al. ....................... 74/55 |
| 2006/0182607 | A1 | * | 8/2006 | Clark et al. ................. 414/744.5 |
| 2008/0310943 | A1 | | 12/2008 | Rau |

(Continued)

FOREIGN PATENT DOCUMENTS

| DE | 24 55 284 | 5/1976 |
| DE | 288 781 A5 | 4/1991 |

(Continued)

*Primary Examiner* — Scott Lowe
(74) *Attorney, Agent, or Firm* — Factor Intellectual Property Law Group, Ltd.

(57) ABSTRACT

In a device for transferring vehicle wheels, an individual vehicle wheel can be gripped by a gripping module having at least one gripping unit which is supported by a frame structure and includes multiple pressing elements that can be pressed against one or more mating surfaces of an individual vehicle wheel. A first gripping module and a second gripping module are mounted on a common rigid support structure which can be rotated about a main axis of rotation by a rotating mechanism. Furthermore, the pressing elements move with a movement component running parallel to the main axis of rotation.

15 Claims, 7 Drawing Sheets

(56) References Cited

U.S. PATENT DOCUMENTS

2009/0028681 A1* 1/2009 Huang ......................... 414/590
2009/0035107 A1   2/2009 Duran et al.
2009/0175710 A2   7/2009 Rau

FOREIGN PATENT DOCUMENTS

| DE | 41 27 446 A1 | 2/1993 |
| DE | 93 08 683 U1 | 7/1993 |
| DE | 197 38 820 A1 | 3/1999 |
| DE | 100 53 804 A1 | 5/2002 |
| DE | 102 49 334 A1 | 5/2004 |
| DE | 10 2005 025 757 A1 | 12/2006 |
| JP | 6-170658 A | 6/1994 |
| WO | 2012110176 A1 | 8/2012 |

* cited by examiner

DEVICE FOR TRANSFERRING VEHICLE WHEELS

RELATED APPLICATIONS

This application claims the filing benefit of International Patent Application No. PCT/EP2012/001916, filed on May 4, 2012, which claims the filing benefit of German Patent Application No. 10 2011 100 828.8 filed on May 7, 2011, the contents of both of which are incorporated herein by reference.

FIELD OF THE INVENTION

The invention relates to a device for transferring vehicle wheels, wherein an individual vehicle wheel can be gripped by means of a gripping module which for this purpose includes at least one gripping unit, supported by a frame structure, with several pressure elements which are capable of being pressed against one or more opposite surfaces of an individual vehicle wheel.

BACKGROUND OF THE INVENTION

Vehicle wheels, and in particular light-alloy wheels of motor vehicles, which are customarily designated as alloy rims, are coated in surface-treatment plants with a powder or with another coating material. Subsequently the coating is baked in an oven. For this purpose the vehicle wheels have to be passed from a coating station to an oven. Vehicle wheels made of other materials, in particular steel wheels, are also treated in consecutive operations. Generally speaking, vehicle wheels, irrespective of their material, have to be passed from a first working area to another working area.

For this purpose, use is made of transfer devices of the aforementioned type which are known commercially and in which a gripping module has been fastened to a multi-axial robot arm, by virtue of which the transfer can take place with as many degrees of freedom of motion as possible.

In this case the robot arm picks up one or more vehicle wheels from a first conveyor and moves to a second conveyor to which the robot arm then passes the vehicle wheels. The robot arm then returns unladen to the first conveyor. This idle movement, however, reduces the throughput of the transfer device.

It is therefore an object of the invention to create a device of the aforementioned type with which the throughput in connection with the transferring of vehicle wheels is higher.

SUMMARY OF THE INVENTION

This object may be achieved with a device of the aforementioned type, by virtue of the fact that
a) a first gripping module and a second gripping module have been attached to a common rigid supporting structure which is capable of being rotated about a principal axis of rotation by means of a rotary device;
b) translation means are present, by means of which the pressure elements are capable of being moved with a motion component parallel to the principal axis of rotation.

As a result of this, the possibility has been opened up that the first gripping module picks up one or more vehicle wheels at a first location while the second gripping module, at around the same time and optionally at the same time, surrenders one or more vehicle wheels at another location. The supporting structure can then be rotated, and the gripping modules exchange their positions, and the procedure is repeated. An idle movement of the gripping modules does not occur in this case. By virtue of the translation means, the vehicle wheels held by the pressure elements can be raised or lowered in relation to the conveyors.

In this connection it is favourable if the translation means include a supporting-structure translation device, by means of which the supporting structure is capable of being moved with a motion component parallel to the principal axis of rotation. In this case the gripping modules may have been limited to their essential function, namely that the pressure elements are able to grip and release vehicle wheels.

Alternatively or in addition, the translation means may include a gripping-module translation device, by means of which at least one gripping module is capable of being moved in relation to the supporting structure with a motion component parallel to the principal axis of rotation. In this case the device may, for example, also be employed when vehicle wheels have to be transferred between different height-levels.

Again alternatively or in addition, it may be advantageous if the translation means include at least one pressure-element translation device which has been assigned to a gripping unit of a gripping module and by means of which the pressure elements of this gripping unit is capable of being moved in relation to the frame structure of the gripping module with a motion component parallel to the principal axis of rotation.

If, for example, several vehicle wheels from different production lines are to be brought together, it may be an advantage if at least one gripping module on the supporting structure is displaceable with a motion component perpendicular to the principal axis of rotation. For instance, two feed conveyors may have been arranged parallel to one another, and the gripping module may optionally access the one or the other feed conveyor.

The transfer procedure can be undertaken particularly effectively if at least one of the two gripping modules takes the form of a dual module and comprises a first gripping unit and a second gripping unit, by virtue of which two vehicle wheels can be picked up by the dual module at the same time.

If the dual module is capable of being rotated by means of a rotary device about a secondary axis of rotation which runs parallel to the principal axis of rotation, vehicle wheels may also be conveyed as a pair in different directions towards the device and away from it, respectively.

If the pressure elements of the first gripping unit are capable of being moved in translation independently of the pressure elements of the second gripping unit, individual geometrical differences both in the vehicle wheels and in conveyors which are possibly present may advantageously be considered.

In practice it has proved worthwhile if the gripping modules have been set up in such a manner that vehicle wheels gripped by the gripping modules have been aligned axially parallel to one another relative to the axis of rotation of said wheels.

Furthermore, it is favourable if the pressure elements of a gripping unit have each been supported by a rod element and take the form of pressure discs which are capable of being pressed by their outer edge against an outer surface of a vehicle wheel, and if a gripping unit includes at least three rod elements with pressure disc. By virtue of pressure discs of such a type, the contact area between gripping unit and vehicle wheel can be kept small, as a result of which a fresh surface coating remains largely unimpaired even during transportation.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Embodiments of the invention will now be elucidated in more detail below on the basis of the drawings. Shown in these drawings are.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
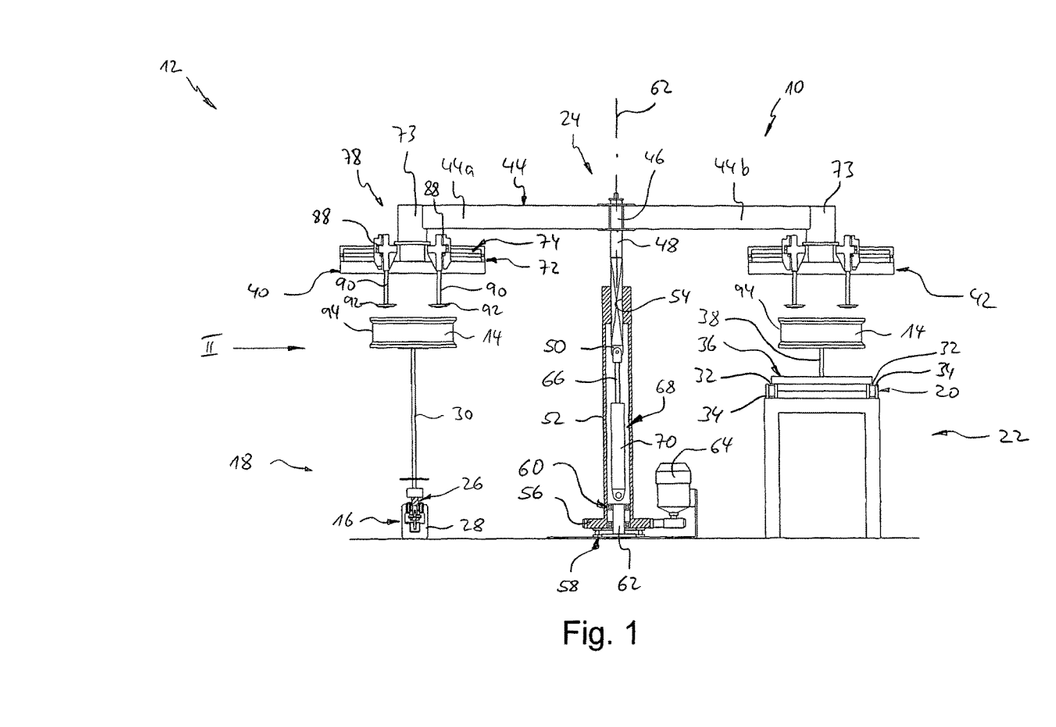
FIG. 1 a transfer station of a plant for surface treatment of vehicle wheels, with a transfer device, by means of which vehicle wheels are transferred from a first conveyor to a second conveyor, the transfer station being shown in a front view from the direction of arrow I in FIG. 2.

In FIG. 1 a transfer station of a surface-treatment plant 12 in which vehicle wheels 14 are provided with a lacquer is denoted overall by 10. In the transfer station 10, vehicle wheels 14 are transferred from a first workpiece conveyor 16, which has been assigned to a first working area 18 of the surface-treatment plant 12, to a second workpiece conveyor 20 in a second working area 22.

For example, in the case of the second working area 22 it may be a question of a drying oven, in the interior of which the second workpiece conveyor 20 is located and which is accessible from outside via an oven inlet. In this case the first workpiece conveyor 16 is able to convey freshly lacquered vehicle wheels 14 to the transfer station, which are transferred from the first workpiece conveyor 16 onto the second workpiece conveyor 20 with the aid of a transfer device 24, in order then to be dried in the drying oven.

The first workpiece conveyor 16 takes the form of a spindle conveyor in which several transport carriages 26 run on a supporting rail 28. The transport carriages 26 carry workpiece spindles 30 with them, each of which can receive a respective vehicle wheel 14. The principle of the spindle conveyor is known as such, for which reason this does not have to be considered in detail.

The second workpiece conveyor 20 takes the form of a chain conveyor which is likewise known as such, and for this purpose includes two conveyor chains 32 revolving in parallel which are guided by a guide profile 34. Workpiece carriers 36 rest on the conveyor chains 32, said carriers being in this way carried along by the conveyor chains 32 in the course of the revolution thereof and moved through the second working area 22, for example the aforementioned drying oven. Each workpiece carrier 36 in the present embodiment includes workpiece spindles 38, onto which vehicle wheels 14 can be mounted.

The spindle conveyor 16 and the chain conveyor 20 have been adapted to one another in such a way that the support planes of the vehicle wheels 14 on the workpiece spindles 30 and 36 of the transport carriages 26 and of the workpiece carriers 34, respectively, are at the same height-level. In the case of modifications elucidated further below, however, the height-levels in question may also differ from one another.

In order that the transfer device 24 is able to pick up and surrender vehicle wheels 14, it includes a first gripping module 40 and a second gripping module 42, which have been attached to a rigid supporting structure in the form of a horizontal supporting bar 44. Relative to its centre, the supporting bar 44 exhibits a first supporting arm 44a and a second supporting arm 44b, the first gripping module 40 having been attached to the first supporting arm 44a, and the second gripping module 42 to the second supporting arm 44b.

The supporting bar 44, in turn, has been connected centrically in torsion-resistant manner to the tip 46 of a vertical bearing mast 48. The opposite end 50 of said mast has been arranged inside a vertical rotary sleeve 52, the bearing mast 48 being slidably guided in a guide passage 54 of the rotary sleeve 52 having complementary cross-section to the bearing mast 48. This will be considered once again further below.

The rotary sleeve 52 leads at the bottom into a horizontally extending support flange 56 with which it rests on a floor-mounted rotary bearing 58. The support flange 56 in addition radially surrounds a bearing unit 60 fastened in torsion-resistant manner inside the rotary sleeve 52, with which the rotary sleeve 52 has been mounted onto a vertical bearing bolt 62 anchored to the bottom in torsion-resistant manner coaxially with the rotary bearing 58. In this manner, the rotary sleeve 52 has been supported so as to be capable of being rotated about a vertical principal axis of rotation 62.

In order to rotate the rotary sleeve 52 about the principal axis of rotation 62, a drive 64 is present which may take the form, for example, of a belt drive or gear drive.

The end 50 of the bearing mast 48 has been connected inside the rotary sleeve 52 to the free end of a piston rod 66 of a cylinder unit 68, which can be electrically, pneumatically or hydraulically extended from a cylinder 70 or retracted again into the latter. The cylinder unit 68 has been anchored in torsion-resistant manner in the rotary sleeve 52 and moves with the latter when the rotary sleeve 52 is rotated. Via the cylinder unit 68, consequently also the horizontal supporting bar 44 with the two gripping modules 40, 42 has been coupled in torsion-resistant manner with the rotary sleeve 52 and rotates jointly in the course of a rotation of the rotary sleeve 52.

Consequently the bearing mast 48, the rotary sleeve 52, the drive 64 thereof and the cylinder unit 68 form a rotary device, by means of which the supporting bar 44 can be rotated about the principal axis of rotation 62. In the present embodiment the principal axis of rotation 62 has been arranged between the two gripping modules 40 and 42.

The cylinder unit 68 forms, in addition, a supporting-structure translation device, by means of which the supporting bar 44 can additionally be moved in translation in the vertical direction, i.e. with a motion component parallel to the principal axis of rotation 62, between an uppermost raised position and a lowermost lowered position, retaining its horizontal orientation. When the piston rod 66 is extended, the supporting bar 44 is raised; when, on the other hand, the piston rod 66 is retracted, the supporting bar 44 is lowered correspondingly.

The gripping modules 40, 42 will now be elucidated by reference to the example provided by the first gripping module 40. The directional data that are used relate in this case to the gripping module 40 as attached to the supporting bar 44 and aligned.

The gripping module 40 includes a frame structure 72 with a centrally arranged bearing block 73 via which the gripping module 40 can be coupled with the supporting bar 44.

The frame structure 72 includes two pairs 74, 76 of guide slats, each slat-pair 74, 76 bearing a first gripping unit 78 and a second gripping unit 80, respectively.

Figure 2:
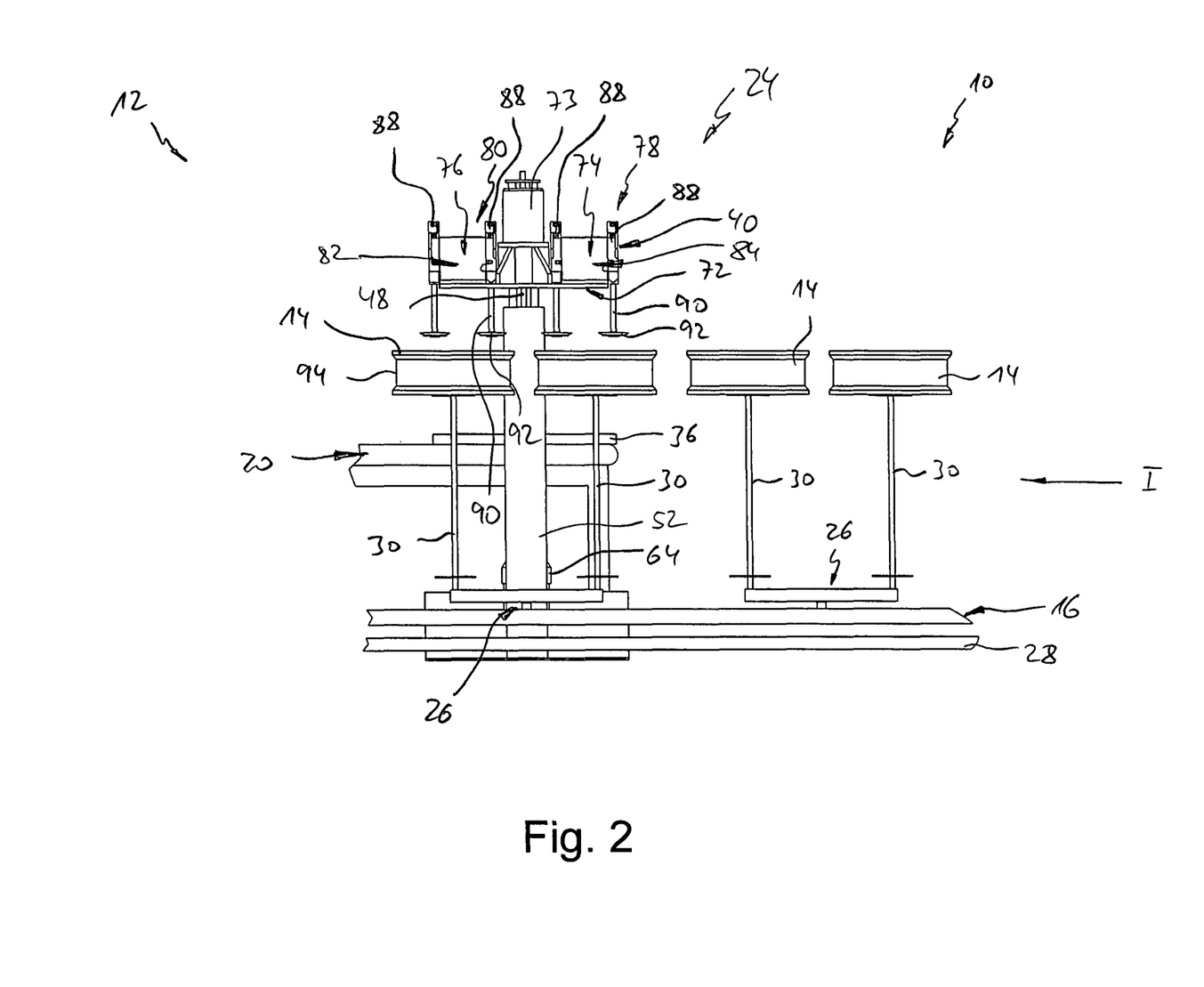
FIG. 2 a side view of the transfer station from the direction of arrow II in FIG. 1.
Figure 3:
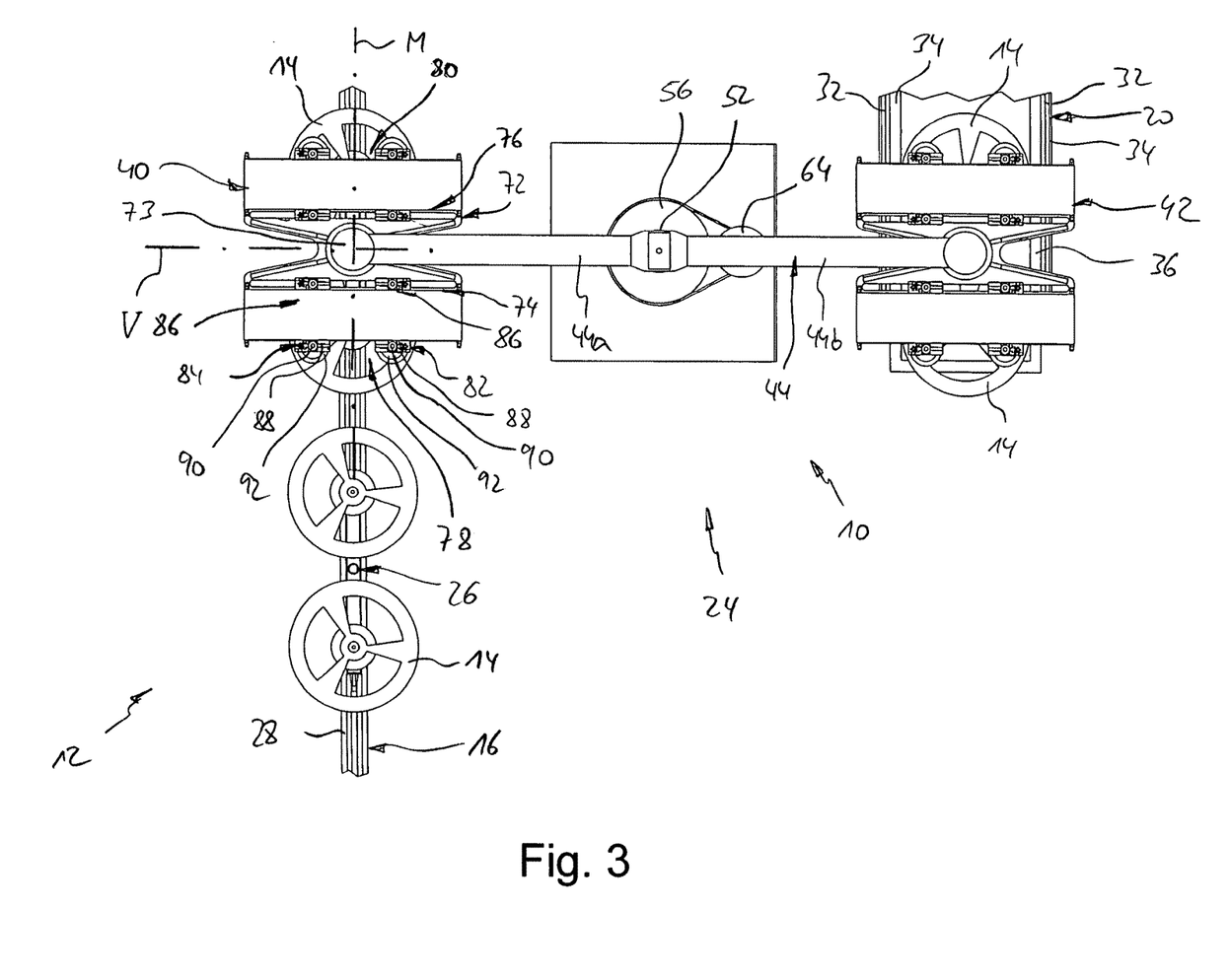
FIG. 3 a view from above of the transfer station according to FIGS. 1 and 2.

The gripping module 40 is mirror-symmetrical with respect to a vertical plane V, shown only in FIG. 3, which passes through the longitudinal axis of the bearing block 73. In the following, merely the first gripping unit 78 will be considered, which can be discerned in FIG. 1 and which has been arranged on the right in FIG. 2 and underneath in FIG. 3. What has been said about this applies, mutatis mutandis, correspondingly to the second gripping unit 80, the corresponding components of which have, for the sake of clarity, not been provided with reference symbols.

The gripping unit 78 includes two supporting slides 82 and 84 which, in turn, have each been supported on both slats of the slat-pair 74 and consequently can be displaced parallel to the slat-pair 74. The supporting slides 82, 84 each carry with them an electric motor 86 by which they can be displaced in motorised manner along the slat-pair 74.

The two slides 82 and 84 have in this case been coupled to one another via a gear linkage, not shown specifically, in such a manner that a movement of both slides 82, 84 always occurs and this movement always occurs symmetrically relative to a vertical plane M which is perpendicular to the aforementioned vertical plane of symmetry V. This plane M is likewise shown only in FIG. 3.

At their opposite ends the slides 82 and 84 each carry a bearing jaw 88. Each bearing jaw 88 in turn supports a downwardly projecting rod 90 which carries a pressure disc 92 coaxially at its lower end, so that said disc has been oriented horizontally. The pressure discs 92 can, as pressure elements, press against the outer wheel surface 94 of a vehicle wheel 14, which serves as opposite surface.

By virtue of the respectively first and second gripping units 78, 80, both gripping modules 40, 42 take the form of a dual module and can each pick up two vehicle wheels 14 at the same time.

In the present embodiment, each gripping unit 78 includes four bearing jaws 88 with rod 90 and pressure disc 92. In principle, it is sufficient if only three of these arrangements are present per gripping unit 78.

The pressure discs 92 may be made of various materials and, depending on where they engage the outer wheel surface 94 of the vehicle wheel 14, may have various designs. Accordingly, they may be made of plastic and may be relatively thick if the wheel shoulder is being engaged. On the other hand, in the case of a contact in the region of the wheel seat they will more likely turn out to be flat. If a freshly coated vehicle wheel 14 is to be gripped, the pressure disc 92 will have a sharp outer edge, so that there is only a small contact area between it and the vehicle wheel 14.

The transfer station 10 described above with the transfer device 24 operates as follows:

By way of initial situation let it be assumed that the first gripping module 40 is located above the spindle conveyor 16, and the second gripping module 42 above the chain conveyor 20, the supporting bar 44 taking up its uppermost raised position. The first gripping module 40 is empty, whereas the second gripping module 42 is carrying a vehicle wheel 14 with each gripping unit 78, 80.

The spindle conveyor 16 has already conveyed two vehicle wheels 14 beneath the first gripping module 40, whereas the chain conveyor 20 has positioned an empty workpiece carrier 36 beneath the second gripping module 42.

The slides 82 and 84 of the gripping units 78, 80 of the first gripping module 40 have been driven so far apart that the pressure discs 92 of each gripping unit 78, 80 can each be driven via a vehicle wheel 14, by the supporting bar 44 being lowered by means of the cylinder unit 68. In the process the vehicle wheels 14, which have been carried by the second gripping module 42, are mounted onto the workpiece spindles 38 of the workpiece carrier 36 on the chain conveyor 20.

Now the pairs consisting of the slides 82, 84 of both gripping units 78, 80 of the first gripping module 40 are again moved towards one another until the pressure discs 92 of each gripping unit 78, 80 are resting on the outer wheel surfaces 94 of the vehicle wheels 14. A centring of the pressure discs 92 relative to the median plane M is undertaken automatically in this case by reason of the aforementioned racks. The first gripping module 40 has now picked up the two vehicle wheels 14 from the spindle conveyor 16.

At the same time, the slides 82, 84 of the second gripping module 42 are driven apart, as a result of which the second gripping module 42 releases the vehicle wheels 14 to the workpiece carrier 36 of the chain conveyor 20.

The supporting bar 44 is then driven into its uppermost raised position by means of the cylinder unit 68. In the process the first gripping module 40 lifts the vehicle wheels 14 off the spindle conveyor 16, whereas the second gripping module 42 is lifted empty from the workpiece carrier 36 of the chain conveyor 20.

Now the drive 64 of the rotary device is actuated and the supporting bar 44 is rotated about the principal axis of rotation 62 by 180°, so that the first, laden gripping module 40 comes to be situated above the chain conveyor 20, and the second, empty gripping module 42 comes to be situated above the spindle conveyor 16. Meanwhile, both the spindle conveyor 16 and the chain conveyor 20 have kept running, as a result of which on the spindle conveyor 16 two further vehicle wheels 14 are already located beneath the second gripping module 42, and on the chain conveyor 20 an empty workpiece carrier 36 has been arranged beneath the first gripping module 40.

The picking-up, described above, of vehicle wheels 14 from the spindle conveyor 16 and the passing of vehicle wheels 14 to the chain conveyor 20 are now carried out again with gripping modules 40, 42 interchanged in their positions, and always alternately after this.

Figure 4:
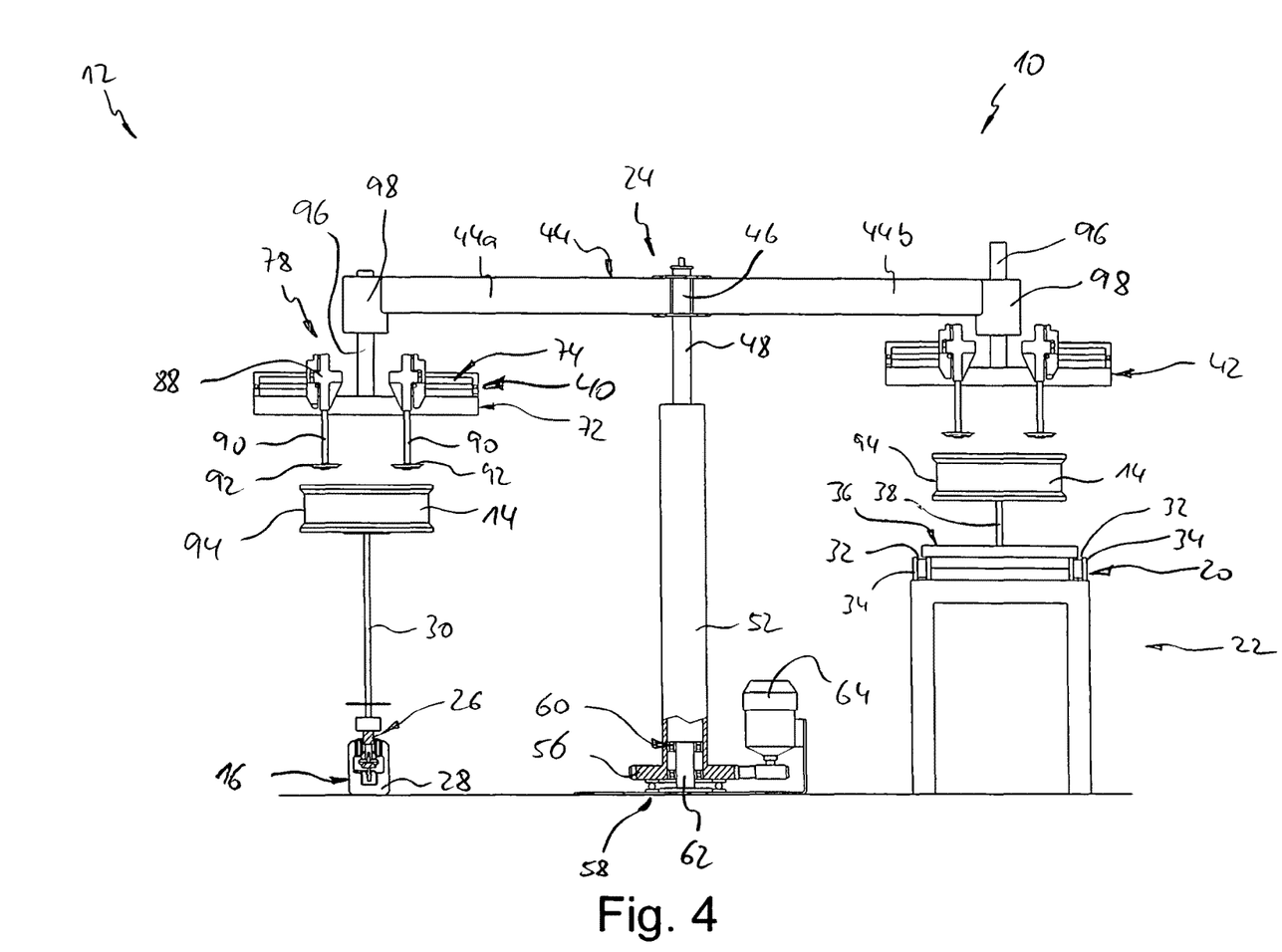
FIG. 4 a view, corresponding to FIG. 1, of a second embodiment of a transfer station with a modified transfer device.

In FIG. 4 a second embodiment with a modified transfer device 24 is shown. In the case of this transfer device, each gripping module 40, 42 can additionally be driven up and down in the vertical direction in relation to the supporting bar 44. For this purpose, each gripping module 40, 42 has been supported by a vertical supporting rod 96 which has been coupled in each instance with an electric motor 98, so that said supporting rod can be shifted up or down in-motorised manner, carrying the respective gripping module 40, 42 with it. In this way, each supporting rod 96 with the associated motor 98 forms respectively a gripping-module translation device, by means of which the corresponding gripping module 40, 42 is capable of being moved in relation to the supporting bar 44 with a motion component parallel to the principal axis of rotation 62.

By virtue of this measure, vehicle wheels 14 can be transferred between different height-levels, this having been illustrated in FIG. 4, in that the vehicle wheels 14 on the spindle conveyor 16 are situated lower down than the vehicle wheels 14 on the workpiece carrier 36 of the chain conveyor 20.

Figure 5:
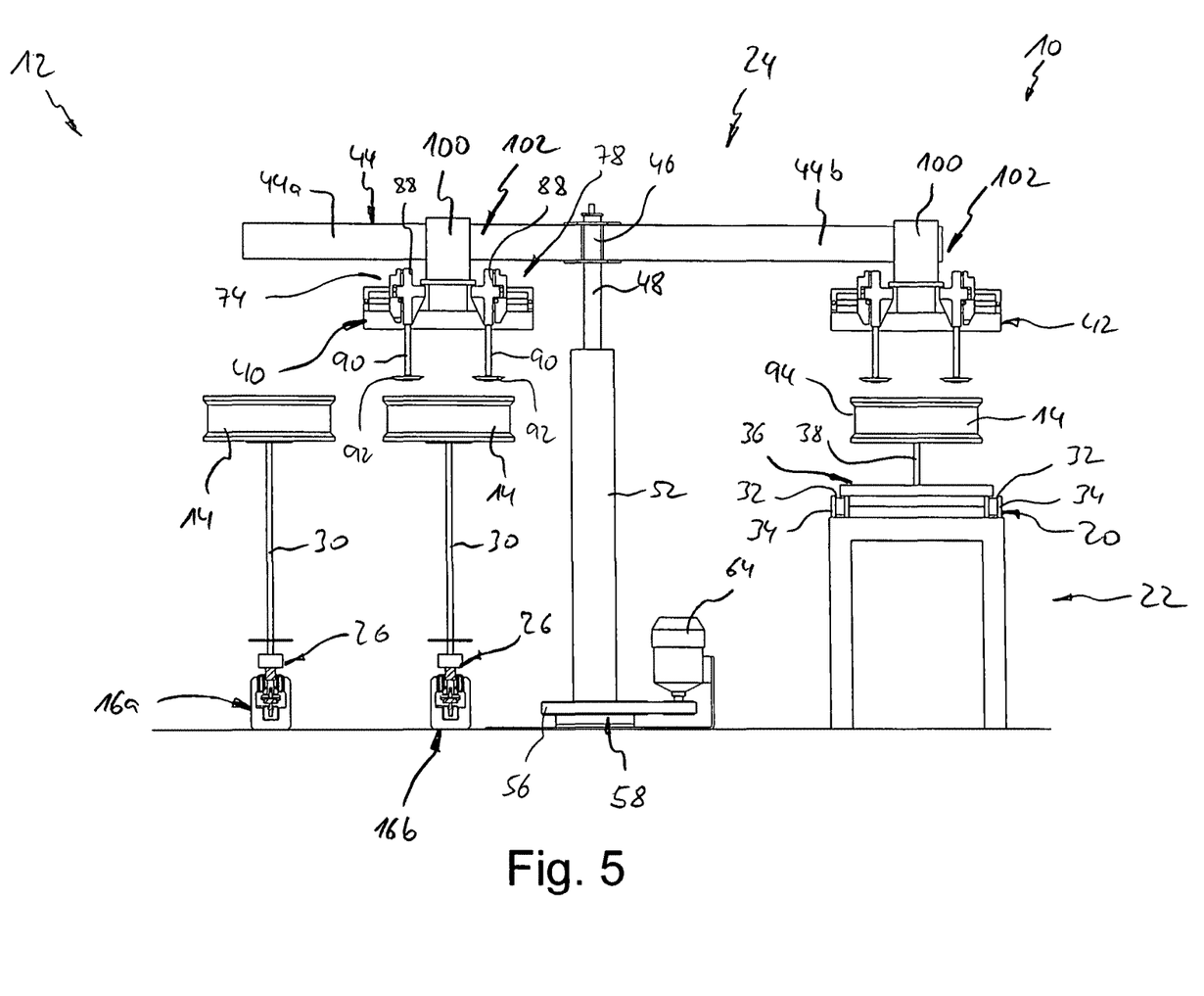
FIG. 5 a view, corresponding to FIG. 1, of a third embodiment of a transfer station with a further modified transfer device and with a modified first conveyor.

In FIG. 5 a third embodiment with a further modified transfer device 24 is shown. In this device each gripping module 40, 42 has been carried along by a slide 100. The latter can be displaced along the supporting bar 44 with the aid of an electric motor which is not shown specifically. Consequently a displacing device 102 has been formed, by virtue of which the gripping modules 40, 42 on the supporting bar 44 are displaceable with a motion components perpendicular to the principal axis of rotation 62. The gripping modules 40, 42 may in this case be displaced independently of one another.

The additional axis of motion of the gripping modules 40, 42 may, for example, be necessary if two conveyors are present which convey vehicle wheels 14 from different production lines to the transfer station 10. This has been illustrated in FIG. 5 with reference to an example of two spindle conveyors 16a, 16b which extend parallel alongside one another. By virtue of the displaceability of the gripping modules 40, 42 along the supporting bar 44, optionally vehicle wheels 14 can now be transferred from the first spindle conveyor 16a or from the second spindle conveyor 16b onto the chain conveyor 20.

Figure 6:
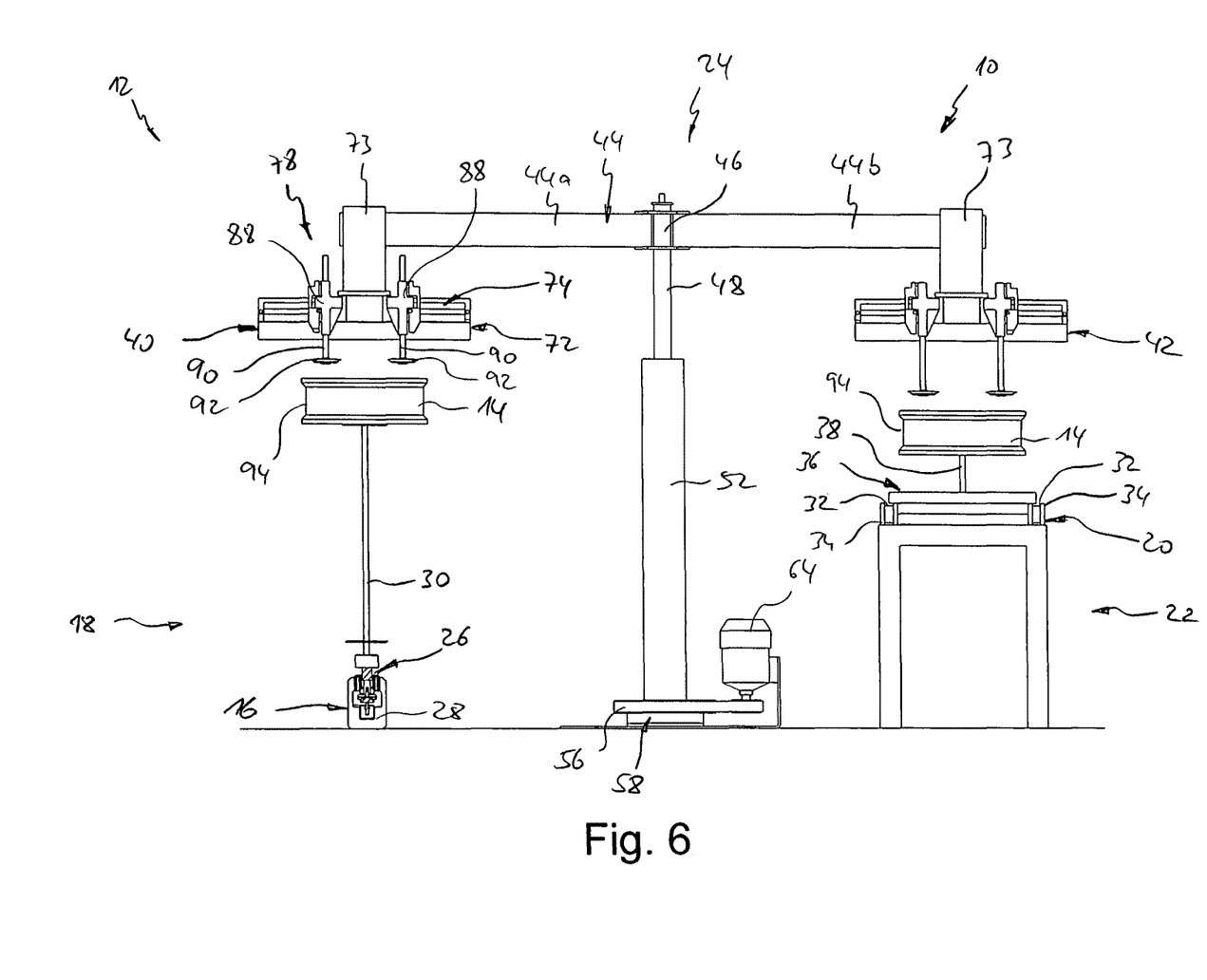
FIG. 6 a view, corresponding to FIG. 1, of a fourth embodiment of a transfer station with a further modified transfer device.

In FIG. 6 a fourth embodiment with a further modified transfer device 24 is shown. Although no gripping-module translation device 96, 98 is present therein, each rod 90 with the associated pressure disc 92 has been supported in a guide channel not specifically provided with a reference symbol, so as to be capable of being shifted up and down by the associated bearing jaw 88.

In addition, each bearing jaw 88 carries its own electric motor, likewise not provided with a reference symbol, which has been coupled with the respective rod 90 so that the latter can be shifted up or down in motorised manner. Consequently, several pressure-disc translation devices are present, one of which in each instance has been assigned to a gripping unit 78, 80 of a gripping module 40, 42, and by means of which the pressure elements 92 of this gripping unit 78, 80 is capable of being moved in relation to the frame structure 72 of the gripping module 40, 42 with a motion component parallel to the principal axis of rotation 62.

By this means, the axial position of each vehicle wheel 14 relative to the frame structure 72 can be set. Also by virtue of this measure, vehicle wheels 14 can be transferred between different height-levels, this being illustrated in FIG. 6, in that the vehicle wheels 14 on the spindle conveyor 16 are situated higher up than the vehicle wheels 14 on the workpiece carrier 36 of the chain conveyor 20.

Figure 7:
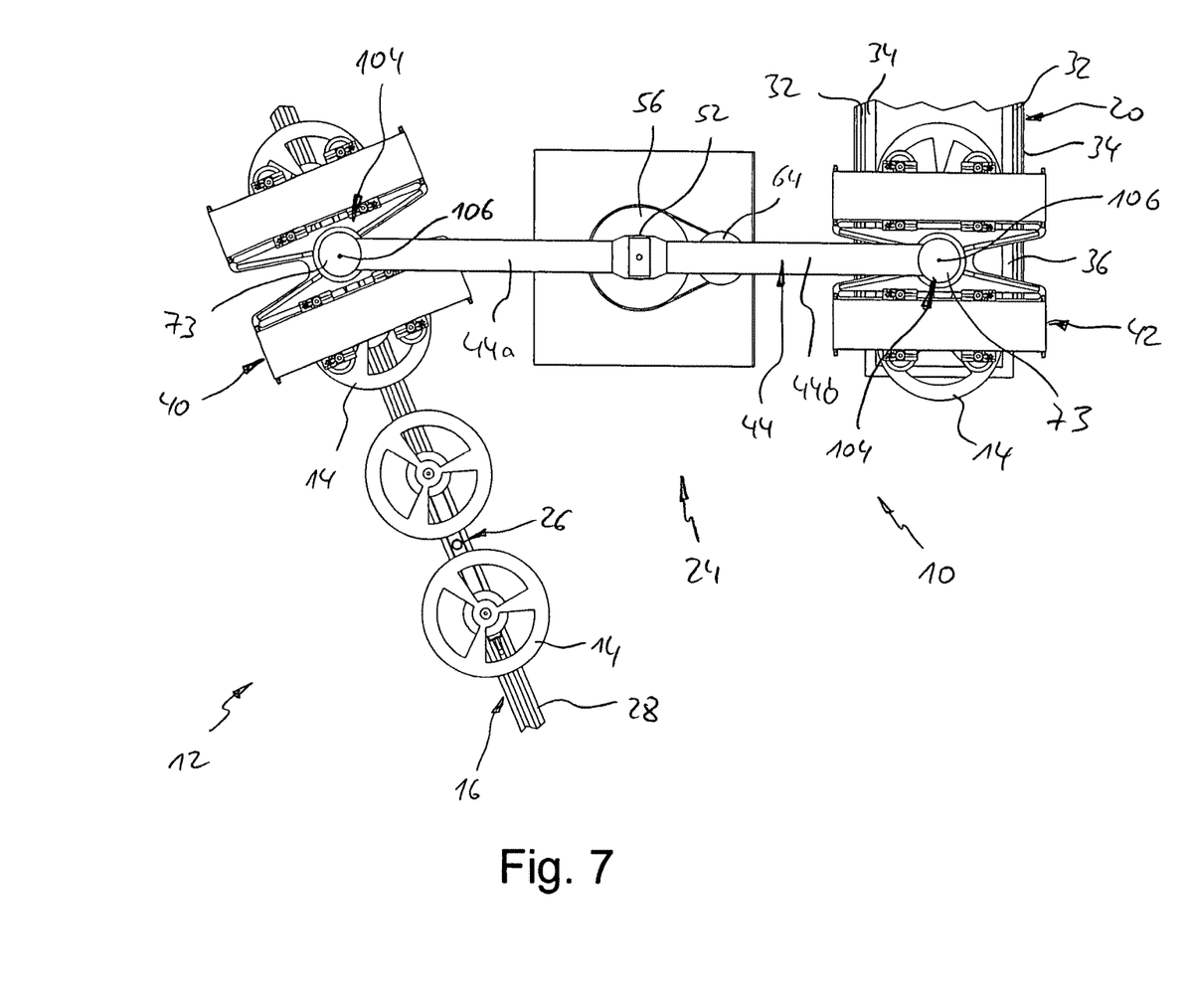
FIG. 7 a view, corresponding to FIG. 3, from above of a fifth embodiment of a transfer station with a further modified transfer device.

In FIG. 7 a fifth embodiment with a further modified transfer device 24 is shown, in which each gripping module 40, 42 is capable of being rotated by means of a rotary device 104 about a secondary axis of rotation 106 which extends parallel to the principal axis of rotation 62. The secondary axis 106 extends here coaxially with the bearing block 73.

By this means, the first and the second workpiece conveyors 16, 20 do not have to extend parallel to one another and do not have to convey the vehicle wheels 14 as a pair parallel to one another. This is illustrated in FIG. 7, in that the spindle conveyor 16 extends at an angle relative to the chain conveyor 20.

In all the embodiments described above, between the first and the second workpiece conveyors 16 and 20 intermediate stations may have been provided, onto which the vehicle wheels 14 can be deposited after the surface treatment for a subsequent machining or inspection. These intermediate stations can be reached by the transfer station 10 after a rotation of the supporting bar 44 of less than 180°, as occurs here for the purpose of transporting the vehicle wheels 14 from the first to the second workpiece conveyor 16 and 20, respectively. By way of subsequent machining, a cleaning of the rim flange, for example, may be undertaken.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A device for transferring vehicle wheels, wherein an individual vehicle wheel can be gripped comprising:
   a gripping module for griping an individual vehicle wheel and which includes at least one gripping unit, supported by a frame structure, with several pressure elements which are capable of being pressed against one or more opposite surfaces of the individual vehicle wheel,
   wherein
   a) a first gripping module and a second gripping module are attached to a common rigid supporting structure which is capable of being rotated about a principal axis of rotation by a rotary device, the rotary device being extendable and retractable and,
   b) translation means are present, which move the pressure elements with a motion component parallel to the principal axis of rotation, wherein the translation means include at least one pressure-element translation device which has been assigned to a gripping unit of a gripping module and which moves the pressure elements of this gripping unit in relation to the frame structure of the gripping module with a motion component parallel to the principal axis of rotation.

2. The device according to claim 1, wherein the extension and retraction of the rotary device moves the common rigid supporting structure with a motion component parallel to the principal axis of rotation.

3. The device according to claim 1, wherein the translation means include a gripping-module translation device, which moves at least one gripping module in relation to the supporting structure with a motion component parallel to the principal axis of rotation.

4. The device according to claim 1, wherein at least one gripping module on the supporting structure is displaceable with a motion component perpendicular to the principal axis of rotation.

5. The device according to claim 1 wherein at least one of the two gripping modules comprises a dual module and includes a first gripping unit and a second gripping unit, by virtue of which two vehicle wheels can be picked up by the dual module at the same time.

6. The device according to claim 5, wherein the dual module is capable of being rotated by a rotary device about a secondary axis of rotation which extends parallel to the principal axis of rotation.

7. The device according to claim 5, wherein the pressure elements of the first gripping unit are capable of being moved in translation independently of the pressure elements of the second gripping unit.

8. The device according to claim 1, wherein the gripping modules are configured such that vehicle wheels gripped by the gripping modules have been aligned axially parallel to one another relative to the axis of rotation of said wheels.

9. The device according to claim 1, wherein the pressure elements of a gripping unit have each been supported by a rod element and each comprises a pressure disc which are capable of being pressed by their outer edge against an outer surface of a vehicle wheel, and a gripping unit includes at least three rod elements with a pressure disc.

10. The device according to claim 1, wherein the several pressure elements each include a disc having a sharp outer edge, the sharp outer edge to engage an individual vehicle wheel.

11. The device according to claim 10 further comprising a workpiece spindle, the workpiece spindle being configured to receive a vehicle wheel, wherein the several pressure elements press against one or more opposite surfaces of the individual vehicle wheel after being received on the workpiece spindle, and the workpiece spindle is substantially parallel to the principle axis of rotation.

12. The device of claim 1 further comprising a supporting rod coupled to a motor, wherein the supporting rod couples the gripping module to the supporting structure, and the motor can raise and lower the supporting rod relative to the supporting structure in a direction parallel to the principle axis independently of the movement of the pressure means by the translation means.

13. The device of claim 1 wherein the rotary device includes an internal piston, the piston being use to extend and retract the rotary device.

14. The device of claim 1 wherein the at least one gripping unit includes two supporting slides, each supporting slide carrying one pressure element and being coupled to the other so that the two supporting slides move simultaneously in a symmetrical manner relative to a plane running parallel to the axis of rotation.

15. The device of claim 14 wherein each gripping module includes two gripping units being rotationally connected at a rotation point, each gripping unit having two supporting slides each carrying one pressure element, the supporting slides of each gripping unit is coupled to the other so that the two supporting slides move simultaneously in a symmetrical manner relative to a plane running parallel to the axis of rotation, wherein the plane running parallel to the axis of rotation extends through the rotation point.

* * * * *